Dec. 12, 1967 P. HENNINGER ET AL 3,358,273

MAGNETIC STORAGE CONDUCTOR DEVICE FOR ELECTRONIC COMPUTERS

Filed July 11, 1960

INVENTOR.
JOSEF BRACKMANN

Stiee & Stiee
ATTORNEYS

United States Patent Office 3,358,273

Patented Dec. 12, 1967

3,358,273

MAGNETIC STORAGE CONDUCTOR DEVICE FOR ELECTRONIC COMPUTERS

Paul Henninger and Josef Brackmann, Munich, Germany, assignors to Siemens & Halske Akiengesellschaft, Berlin and Munich, Germany, a corporation of Germany Filed July 11, 1960, Ser. No. 42,096
Claims priority, application Germany, Aug. 6, 1959, S 64,322
4 Claims. (Cl. 340—174)

This invention is concerned with a conductor device provided with a thin magnetic layer, for storage purposes in electronic computers.

It has become known to provide storers, for transistor operated electronic high speed computers employing very low magnetizing currents, with thin vaporized magnetic coatings, such storers however permitting only construction of very complicated and expensive matrices.

Other principles are involved in storers known under the name of Twistor, consisting of a webbing of magnetic and nonmagnetic wires. The magnetic wires which are about 25$\mu$m. thick are helically twisted to assume a preferential magnetic direction inclined by about 45° longitudinal axis.

Instead of making the wires of magnetic material, it has also become known to provide upon a good conductor, for example, copper, a thin magnetic casing surrounding it. Such encased wires can be produced by extrusion or by special plating operations and the preferential direction, of the magnetic casing, required for the Twistor, can likewise be produced by twisting of the wires.

Another variant is found in the use of wires of good conductivity having a narrow thin band, for example, 6$\mu$ thick, helically wound thereon with a pitch of 45°. To this band is imparted, by rolling or the like, a longitudinally effective preferential magnetic direction. In order to obtain the best magnetic properties, the wire, with the coiled band wound thereon, must be subjected to an annealing operation.

However, the previously employed procedures for the magnetic encasing of the wires with helically extending preferential magnetic direction, permits only the use of layers with a thickness exceeding about 5 microns. These relatively thick layers entail due to the formation of eddy currents, longer switching times, thereby reducing the operating speeds of the computer and resulting in relatively low operatively effective voltages which are inversely proportional to the switching times.

This situation poses the problem to find suitable conductor devices which permit construction of matrices according to the above stated Twistor principle.

The present invention proposes to provide, for the solution of this problem, a conductor device for storage purposes in connection with electronic computers, employing a metallic layer with a thickness of only about 1 micron, which is precipitated on a conductor chemically, electrolytically or from a gas- or vapor phase, and to which is imparted during or after precipitation thereof, a preferential direction extending especially helically about the longitudinal axis of the conductor. For this purpose, there is formed about the wire or conductor, during or after the precipitation of the layer, a circular field by causing a current to flow through the conductor corresponding to the desired strength of the circular field; if it is desired to provide for a helical preferential direction of the layer, a field is superposed on the circular field, for example, by coil means, which is of desired strength and extends in longitudinal direction of the conductor. The current flowing in the conductor or wire which is being provided or which has been provided with the layer, and the field extending in a direction longitudinally of the conductor, are of a magnitude such that the tangential and axial field components, in the magnetic layer on the conductor, are approximately of equal values, the action of the two components thereby producing a magnetic field moving at 45° helically about the conductor, such field impressing the preferential direction on the magnetic layer. As has been said before, the magnetic preferential direction can be impressed upon the layer during the precipitation thereof upon the conductor or subsequently, upon the precipitated layer, by subjecting such layer to the helically moving field while at the same time heating it to a sufficiently high temperature.

The layer may be vaporized directly upon the non-insulated conductor, for example, a copper conductor. It is understood, however, that it is within the scope of the invention to provide such a layer upon an insulating coating or jacket surrounding the conductor. It is moreover possible to precipitate a plurality of mutually insulated magnetic layers upon the conductor, by forming an insulating jacket on the first precipitated layer and precipitating upon such insulating jacket a second magnetic layer. The intermediate insulating layers may consist, for example of vaporized $SiO_2$. The provision of several such mutually insulated magnetic layers, extending helically or in the form of rings, may gain importance when it is desired to employ auxiliary lines for selectively influencing the storage elements, for example, pickup lines, reading lines, inhibiting lines, etc., operating in common or in sections. The magnetic layers extending in mutually insulated relationship, which also have defined conductivity, can thereby serve as auxiliary lines of this character. The use of a plurality of thin mutually insulated or superposed magnetic layers provided upon conductors, results moreover in a considerably higher output voltage corresponding to the increased cross-sectional area, without entailing increased switching times caused by eddy currents.

Instead of using the magnetic layers in part as lines, it is possible to provide a plurality of lines with a common insulating jacket and to provide upon such jacket the magnetic layers.

The various objects and features of the invention will appear from the description which is rendered below with reference to the accompanying drawing. In the drawing, FIG. 1 illustrates a conductor device provided with a helically extending layer;

Figure 1:
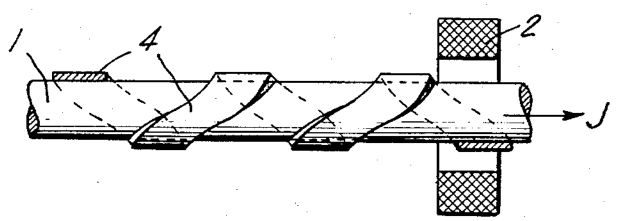
Figure 2:
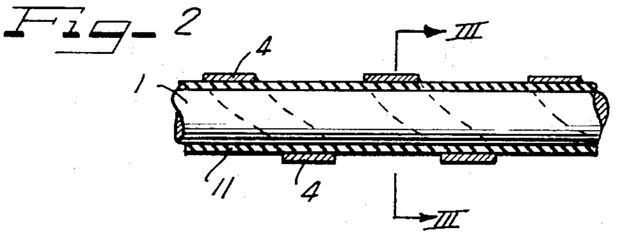
FIG. 2 represents a conductor device provided with an insulating jacket carying a magnetizable helically extending metallic layer.
Figure 3:
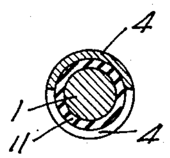
FIG. 3 is a section of FIG. 2 taken along line A–B thereof.

In FIG. 1, numeral 1 indicates a conductor made, for example, of copper and having a diameter of only about 0.05 to 2 millimeter. Upon this conductor is provided a helically extending layer 4 of magnetic material. The conductor 1 is traversed by current flowing in the direction of the arrow J, which produces in known manner a field extending circularly about the conductor 1. Superimposition of a further direct field, produced, for example, by a coil 2 which surrounds the conductor, extending longitudinally thereof, will result in the helical field which impresses the desired preferential direction on the magnetic layer 3 upon precipitation thereof or incident to subsequent heat treatment thereof. This layer is in this case vaporized directly, that is, without an intermediate insulation, upon the metal of the conductor 1. It is important that the thickness of this layer be very slight; while a thickness of about 0.5 micron is recommended for the layer, the thickness of any layer employed may vary from about 0.1 micron to a few $\mu$m. In order to insulate the helical magnetic layer from the conductor the layer may be provided with a continuous insulating jacket 11, as shown in FIGS. 2 and 3, and a metallic helically extending layer may thereupon be precipitated upon the jacket 11.

Figure 4:
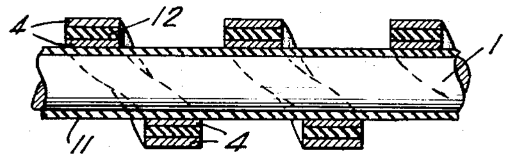
FIG. 4 illustrates an embodiment comprising alternately successively disposed metal and insulating layers.

As shown in FIG. 4, the layer may be formed of a plurality of partial layers 12, with thin insulating layers extending therebetween, for example, by vaporization of SiO with subsequent oxidation to form $SiO_2$. The precipitation may be effected in a manner different from vaporization, for example, in accordance with the known carbonyl method in which the metal of the magnetic layer, that is, for example, iron, is precipitated or deposited upon the heated carrier from an iron carbonyl compound.

Figure 5:
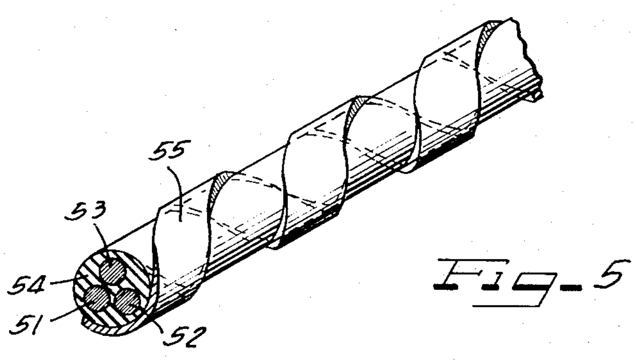
FIG. 5 shows in perspective view an embodiment comprising a plurality of mutually insulated conductors encased in a common insulating jacket on which is provided a helically extending magnetic layer.

FIG. 5 illustrates in perspective view a further very advantageous embodiment of the invention according to which the magnetic layer surrounds or encases a plurality of lines. Numerals 51, 52, 53 indicate three mutually insulated conductors or lines contained in a common insulating jacket 54. The very thin magnetic layer 55 surrounding the three lines 51, 52, 53, as in the other examples, extends helically. The preferred magnetic direction is imparted to the layer 55 in the manner described before.

Changes may be made within the scope and spirit of the appended claims which define what is believed to be new and desired to have protected by Letters Patent.

We claim:

1. A conductor device for storage purposes in electronic computers, comprising conductor means, a metallic magnetic layer with a thickness of about 0.1$\mu$ to a few $\mu$ surrounding said conductor means said layer extending helically about said conductor means, and has a preferential magnetic direction imparted thereto in alignment with said helical layer configuration, and an insulating jacket surrounding said conductor means and carrying said layer.

2. A conductor device for storage purposes in electronic computers, comprising conductor means and a metallic magnetic layer with a thickness of about 0.1$\mu$ to a few $\mu$ surrounding said conductor means, said layer extending helically about said conductor means, and has a preferential magnetic direction imparted thereto in alignment with said helical layer configuration, said layer being formed of a plurality of mutually insulated partial layers.

3. A conductor device for storage purposes in electronic computers, comprising conductor means, a metallic magnetic layer with a thickness of about 0.1$\mu$ to a few $\mu$ surrounding said conductor means, said layer extending helically about said conductor means, and has a preferential magnetic direction imparted thereto in alignment with said helical layer configuration, and an insulating jacket surrounding said conductor means and carrying said layer which comprises a plurality of mutually insulated partial layers.

4. A conductor device for storage purposes in electronic computers, comprising conductor means and a metallic magnetic layer with a thickness of about 0.1$\mu$ to a few $\mu$ surrounding said conductor means, said layer extending helically about said conductor means, and has a preferential magnetic direction imparted thereto in alignment with said helical layer configuration, said conductor means comprising a plurality of conductors contained in a common insulating jacket, sail helical layer extending about said jacket.

References Cited

UNITED STATES PATENTS

| | | | |
|---|---|---|---|
| 2,671,950 | 3/1954 | Sukacev | 29—155.5 |
| 2,877,540 | 3/1959 | Austen | 29—155.5 |
| 2,878,463 | 3/1959 | Austen | 340—174 |
| 2,882,519 | 4/1959 | Wallentine | 340—174 |
| 3,069,661 | 12/1963 | Gianola | 340—174 |
| 3,083,353 | 3/1963 | Bobeck | 340—174 |
| 3,134,965 | 5/1964 | Meier | 340—174 |
| 3,138,785 | 6/1964 | Chapman et al. | 340—174 |
| 3,197,749 | 7/1965 | Clinehens et al. | 340—174 |

OTHER REFERENCES

Bobeck, Andrew H.: A New Storage Element Suitable for Large-Sized Memory Arrays—The Twistor, The Bell System Technical Journal, vol. 36, No. 6, November 1957, pp. 1319–1340.

Looney, Duncan H.: Computer Components—Recent Advance in Magnetic Devices for Computers, Journal of Applied Physics, Supplement to vol. 30, No. 4, April 1959, pp. 38S–42S.

BERNARD KONICK, *Primary Examiner.*

IRVING SRAGOW, JAMES W. MOFFITT, JOHN BURNS, *Examiners.*

J. J. POSTA, J. P. SCHERLACHER, *Assistant Examiners.*